United States Patent
Yuwaki et al.

(10) Patent No.: US 11,472,121 B2
(45) Date of Patent: *Oct. 18, 2022

(54) THREE-DIMENSIONAL SHAPING APPARATUS AND METHOD OF MANUFACTURING THREE-DIMENSIONAL SHAPING OBJECT

(71) Applicant: Seiko Epson Corporation, Toyko (JP)

(72) Inventors: Kohei Yuwaki, Shiojiri (JP); Satoshi Yamazaki, Matsumoto (JP)

(73) Assignee: SEIKO EPSON CORPORATION

( * ) Notice: Subject to any disclaimer, the term of this patent is extended or adjusted under 35 U.S.C. 154(b) by 0 days.

This patent is subject to a terminal disclaimer.

(21) Appl. No.: 17/167,516

(22) Filed: Feb. 4, 2021

(65) Prior Publication Data

US 2021/0178701 A1 Jun. 17, 2021

Related U.S. Application Data

(62) Division of application No. 16/697,300, filed on Nov. 27, 2019, now Pat. No. 11,077,619.

(30) Foreign Application Priority Data

Nov. 28, 2018 (JP) .............................. JP2018-221813

(51) Int. Cl.
*B29C 64/393* (2017.01)
*B33Y 10/00* (2015.01)
(Continued)

(52) U.S. Cl.
CPC .......... *B29C 64/393* (2017.08); *B29C 64/118* (2017.08); *B29C 64/209* (2017.08);
(Continued)

(58) Field of Classification Search
CPC ... B29C 64/209; B29C 64/118; B29C 64/393; B33Y 10/00; B33Y 50/02; B33Y 30/00;
(Continued)

(56) References Cited

U.S. PATENT DOCUMENTS 5,260,009 A   11/1993 Penn
5,303,141 A   4/1994 Batchelder et al.
(Continued)

FOREIGN PATENT DOCUMENTS

CN   103878979 A   6/2014
CN   104290325 A   1/2015
(Continued)

*Primary Examiner* — Nahida Sultana
(74) *Attorney, Agent, or Firm* — Harness, Dickey & Pierce, P.L.C.

(57) ABSTRACT

A three-dimensional shaping apparatus includes a plasticizing portion plasticizing a material to generate a shaping material, a nozzle having a discharge port discharging the shaping material toward a table, a movement mechanism changing a relative position between the nozzle and the table, a discharge control mechanism provided in a flow path which connects the plasticizing portion to the nozzle and controlling a discharge amount of the shaping material from the nozzle, and a control portion controlling the plasticizing portion, the movement mechanism, and the discharge control mechanism to shape the three-dimensional shaping object. The control portion controls the discharge control mechanism so that when a relative movement speed between the nozzle and the table is a first speed, the discharge amount of the shaping material is set to a first discharge amount, and when the relative movement speed between the nozzle and the table is a second speed which is slower than the first speed, the discharge amount of the shaping material is set to a second discharge amount which is smaller than the first discharge amount.

6 Claims, 5 Drawing Sheets

(51) Int. Cl.
*B29C 64/209* (2017.01)
*B33Y 50/02* (2015.01)
*B29C 64/118* (2017.01)
*B33Y 30/00* (2015.01)

(52) U.S. Cl.
CPC ............... *B33Y 10/00* (2014.12); *B33Y 30/00* (2014.12); *B33Y 50/02* (2014.12)

(58) Field of Classification Search
CPC .......... B22F 2999/00; B22F 2009/0888; B22F 3/008; B22F 3/115
See application file for complete search history.

(56) References Cited

U.S. PATENT DOCUMENTS

| | | | |
|---|---|---|---|
| 5,340,433 | A | 8/1994 | Crump |
| 5,402,351 | A | 3/1995 | Batchelder et al. |
| 6,401,001 | B1 | 6/2002 | Jang et al. |
| 6,578,596 | B1 | 6/2003 | Batchelder et al. |
| 2005/0015175 | A1 | 1/2005 | Huang |
| 2013/0141491 | A1 | 6/2013 | Krichtman et al. |
| 2014/0252668 | A1 | 9/2014 | Austin et al. |
| 2016/0046073 | A1 | 2/2016 | Hadas |
| 2017/0203506 | A1 | 7/2017 | Hjelsand et al. |
| 2017/0203507 | A1 | 7/2017 | Leavitt et al. |
| 2017/0210069 | A1 | 7/2017 | Stubenruss |
| 2017/0210074 | A1 | 7/2017 | Ueda et al. |
| 2017/0297107 | A1 | 10/2017 | Oka et al. |
| 2018/0200955 | A1 | 7/2018 | Hoelldorfer et al. |
| 2018/0311894 | A1 | 11/2018 | Saito et al. |
| 2019/0022934 | A1 | 1/2019 | Kobe et al. |
| 2019/0022940 | A1* | 1/2019 | Hofmann ............... B29C 64/259 |
| 2019/0030811 | A1 | 1/2019 | Gasso et al. |
| 2019/0076924 | A1 | 3/2019 | Jepeal et al. |
| 2019/0168446 | A1 | 6/2019 | Leibig et al. |
| 2019/0315114 | A1 | 10/2019 | Hjelsand et al. |
| 2019/0375003 | A1 | 12/2019 | Mark |
| 2020/0230942 | A1 | 7/2020 | Gasso et al. |
| 2021/0039306 | A1* | 2/2021 | Busbee ................ A43B 13/026 |
| 2021/0162663 | A1 | 6/2021 | Saito et al. |
| 2021/0387410 | A1* | 12/2021 | Moore .................. B33Y 10/00 |
| 2022/0118524 | A1* | 4/2022 | Nakamura ............. B33Y 40/00 |

FOREIGN PATENT DOCUMENTS

| | | |
|---|---|---|
| CN | 204622625 U | 9/2015 |
| CN | 106573405 A | 4/2017 |
| CN | 108790155 A | 11/2018 |
| EP | 3 437 837 A1 | 2/2019 |
| JP | H03-158228 A | 7/1991 |
| JP | H05-345359 A | 12/1993 |
| JP | H06-179243 A | 6/1994 |
| JP | H07-096534 A | 4/1995 |
| JP | 2005-344765 A | 12/2005 |
| JP | 2006-192710 A | 7/2006 |
| JP | 2015-502870 A | 1/2015 |
| JP | 2015-148309 A | 8/2015 |
| JP | 2017-035811 A | 2/2017 |
| JP | 2017-528340 A | 9/2017 |
| JP | 2017-190505 A | 10/2017 |
| WO | 2015-135434 A1 | 9/2015 |
| WO | 2015-182675 A1 | 12/2015 |
| WO | 2017-008789 A1 | 1/2017 |
| WO | 2017-038984 A1 | 3/2017 |
| WO | 2018/038751 A1 | 3/2018 |

\* cited by examiner

THREE-DIMENSIONAL SHAPING APPARATUS AND METHOD OF MANUFACTURING THREE-DIMENSIONAL SHAPING OBJECT

This application is a divisional of U.S. patent application Ser. No. 16/697,300 filed on Nov. 27, 2019, which is based on, and claims priority from, JP Application Serial Number 2018-221813, filed Nov. 28, 2018, the disclosure of which is hereby incorporated by reference herein in its entirety.

BACKGROUND

1. Technical Field

The present disclosure relates to a three-dimensional shaping apparatus and a method of manufacturing the three-dimensional shaping object.

2. Related Art

JP-A-2006-192710 discloses a technology in which a thermoplastic material heated and melted by a preheater is extruded from an extrusion nozzle which scans in accordance with preset shape data to a specific area on a base and the further-melted material is stacked on the cured material on the base to shape a three-dimensional object.

When the extrusion nozzle is moved according to the shape data as in the technology described in JP-A-2006-192710, a movement speed of the nozzle may be reduced depending on a shaping location such as a corner of a shaping object. When an amount of a material discharged from the nozzle is constant, reducing the movement speed of the nozzle may cause the discharge amount of the material to be excessive, which may lower shaping precision.

SUMMARY

An advantage of some aspects of the present disclosure is to improve the shaping precision of the three-dimensional shaping object.

According to a first aspect of the present disclosure, a three-dimensional shaping apparatus that shapes a three-dimensional shaping object is provided. The three-dimensional shaping apparatus includes a plasticizing portion plasticizing a material to generate a shaping material, a nozzle having a discharge port discharging the shaping material toward a table, a movement mechanism changing a relative position between the nozzle and the table, a discharge control mechanism provided in a flow path which connects the plasticizing portion to the nozzle and controlling a discharge amount of the shaping material from the nozzle, and a control portion controlling the plasticizing portion, the movement mechanism, and the discharge control mechanism to shape the three-dimensional shaping object, in which the control portion controls the discharge control mechanism so that when a relative movement speed between the nozzle and the table is a first speed, the discharge amount of the shaping material is set to a first discharge amount, and when the relative movement speed between the nozzle and the table is a second speed which is slower than the first speed, the discharge amount of the shaping material is set to a second discharge amount which is smaller than the first discharge amount.

DESCRIPTION OF EXEMPLARY EMBODIMENTS

A. First Embodiment

Figure 1:
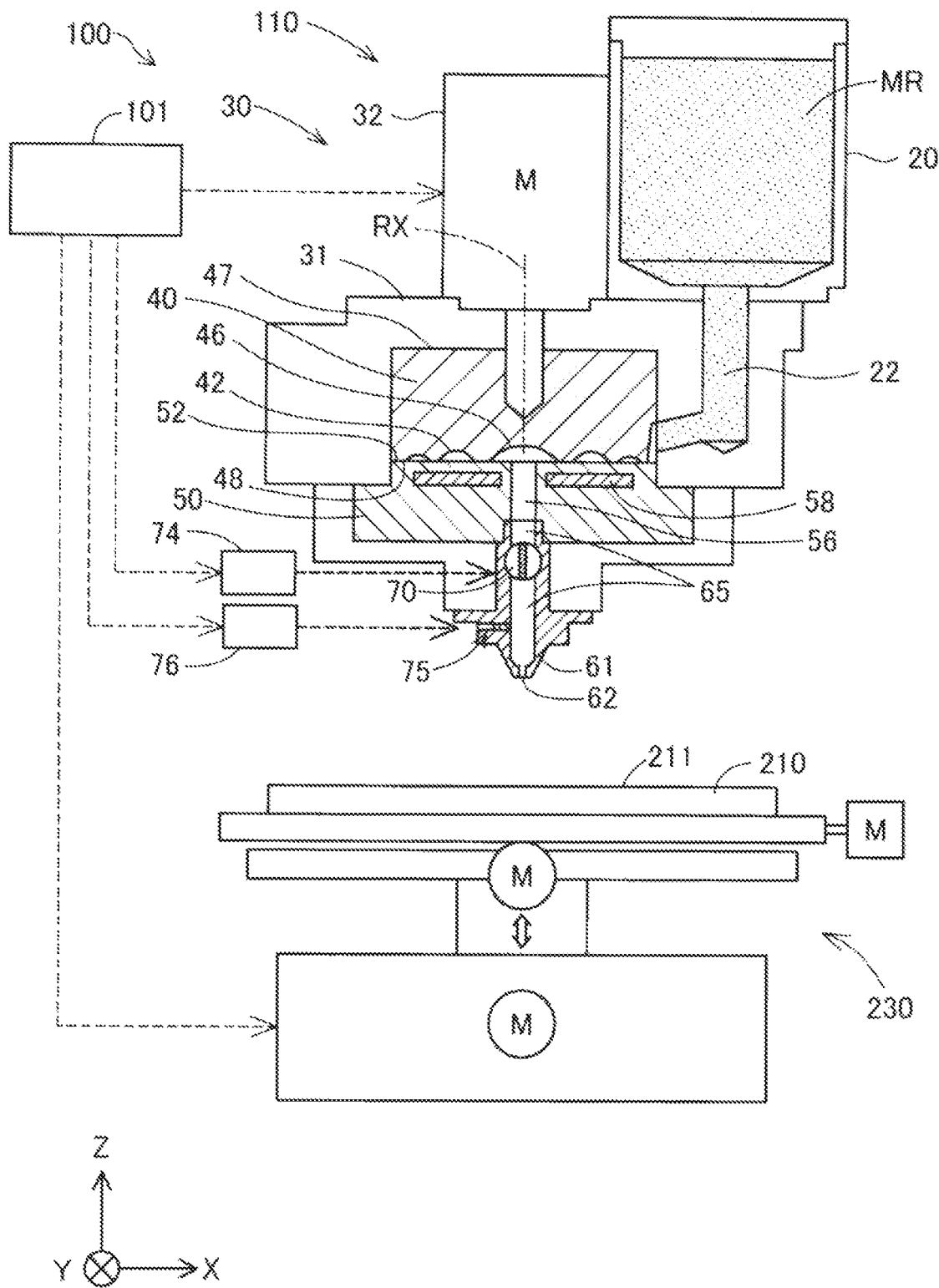
FIG. 1 is an explanatory view showing a schematic configuration of a three-dimensional shaping apparatus.

FIG. 1 is an explanatory view showing a schematic configuration of a three-dimensional shaping apparatus 100 in a first embodiment. In FIG. 1, arrows along X, Y, and Z directions orthogonal to one another are represented. The X direction and the Y direction are directions along a horizontal direction, and the Z direction is a vertically upward direction. In the other figures, arrows along the X, Y, and Z directions are appropriately represented. The X, Y, Z directions in FIG. 1 and the X, Y, and Z directions in the other figures represent the same direction.

The three-dimensional shaping apparatus 100 includes a control portion 101, a shaping portion 110 which generates and discharges a shaping material, a table 210 for shaping a base of a three-dimensional shaping object, and a movement mechanism 230 which controls a discharge position of the shaping material.

The control portion 101 controls the entire operation of the three-dimensional shaping apparatus 100 to perform shaping processing which shapes the three-dimensional shaping object. The control portion 101 is constituted with a computer including one or a plurality of processors and a main storage apparatus. The control portion 101 performs various functions by the processor executing a program read in the main storage apparatus. Further, a part of the functions of the control portion 101 may be realized by a hardware circuit. In the shaping processing performed by the control portion 101, the shaping portion 110 and the movement mechanism 230 are controlled in accordance with shaping data of the three-dimensional shaping object.

The shaping portion 110 discharges the melted paste-like shaping material to a target position on the table 210 under the control of the control portion 101. The shaping portion 110 includes a material supply portion 20 which is a source of a material MR before the material MR is converted to the shaping material, a plasticizing portion 30 converting the material MR to the shaping material, a nozzle 61 having a discharge port 62 which discharges the shaping material toward the table, a discharge control mechanism 70 controlling a discharge amount of the shaping material from the nozzle 61, and a suction portion 75 suctioning and temporarily reserving the shaping material.

The material supply portion 20 supplies the plasticizing portion 30 with the material MR to generate the shaping material. The material supply portion 20 is constituted with, for example, a hopper which accommodates the material MR. The material supply portion 20 is connected to the plasticizing portion 30 via a communication passage 22. The material MR is introduced into the material supply portion 20 in a form of, for example, a pellet or a powder, or the like. Details of the material MR will be described later.

The plasticizing portion 30 plasticizes at least a part of the material MR supplied from the material supply portion 20 to generate the paste-like shaping material exhibiting fluidity, and guides the shaping material to the nozzle 61. The plasticizing portion 30 has a screw case 31, a drive motor 32, a flat screw 40 and a screw facing portion 50. The flat screw 40 is also called a "scroll". The screw facing portion 50 is also called a "barrel". The plasticizing portion 30 may plasticize all of the material MR, or may plasticize a part of the material MR components, for example, when the material MR includes a plurality of components.

The flat screw 40 has a substantially cylindrical shape whose height along a central axis RX thereof is smaller than a diameter thereof. In the present embodiment, the flat screw 40 is disposed such that the central axis RX is parallel to the Z direction.

The flat screw 40 is housed in the screw case 31. An upper surface 47 side of the flat screw 40 is connected to the drive motor 32, and the flat screw 40 rotates around the central axis RX in the screw case 31 by a rotational drive force generated by the drive motor 32. The drive motor 32 drives under the control of the control portion 101.

A groove portion 42 is formed on a lower surface 48 of the flat screw 40. The communication passage 22 of the material supply portion 20 described above communicates with the groove portion 42 from a side surface of the flat screw 40.

The lower surface 48 of the flat screw 40 faces an upper surface 52 of the screw facing portion 50. A space is formed between the groove portion 42 of the lower surface 48 of the flat screw 40 and the upper surface 52 of the screw facing portion 50. The material MR is supplied from the material supply portion 20 to the space. Specific configurations of the flat screw 40 and the groove portion 42 will be described later.

In the screw facing portion 50, a heater 58 for heating the material MR is embedded. The material MR supplied to the groove portion 42 of the flat screw 40 flows along the groove portion 42 by rotation of the flat screw 40 while being melted in the groove portion 42 and is guided to a center portion 46 of the flat screw 40 as the shaping material. The paste-like shaping material flowing into the center portion 46 is supplied to the nozzle 61 through a communication hole 56 provided at a center of the screw facing portion 50. In the shaping material, all types of substances constituting the shaping material may not have to be melted. The shaping material may be converted into a state having fluidity as a whole by melting at least one type of substance among the substances constituting the shaping material.

The nozzle 61 is connected to the communication hole 56 of the screw facing portion 50 through a flow path 65 connecting the plasticizing portion 30 and the nozzle 61. The nozzle 61 discharges the shaping material generated in the plasticizing portion 30 from the discharge port 62 at a tip thereof toward the table 210. In the present embodiment, the flow path 65 extends along the Z direction, and the flow path 65 and the nozzle 61 are disposed along the Z direction.

The table 210 is disposed at a position facing the discharge port 62 of the nozzle 61. In the present embodiment, an upper surface 211 of the table 210 facing the discharge port 62 of the nozzle 61 is disposed horizontally, that is, parallel to the X and Y directions.

The movement mechanism 230 is configured to be able to change a relative position of the table 210 and the nozzle 61. In the present embodiment, a position of the nozzle 61 is fixed, and the movement mechanism 230 moves the table 210. The movement mechanism 230 is constituted with a three-axis positioner which moves the table 210 in the three directions of the X, Y, and Z directions by drive force of three motors. The movement mechanism 230 changes relative positional relationship between the nozzle 61 and the table 210 under the control of the control portion 101.

In another embodiment, a configuration may be adopted in which instead of moving the table 210 by the movement mechanism 230, the movement mechanism 230 moves the nozzle 61 relative to the table 210 with a position of the table 210 fixed. Further, a configuration in which the table 210 is moved in the Z direction by the movement mechanism 230 and the nozzle 61 is moved in the X and Y directions, or a configuration in which the table 210 is moved in the X and Y directions by the movement mechanism 230 and the nozzle 61 is moved in the Z direction, may be adopted. Even in these configurations, the relative positional relationship between the nozzle 61 and the table 210 can be changed.

In the following, "movement of the nozzle 61" or "scanning of the nozzle 61" means change in a relative position of the nozzle 61 with respect to the table 210 unless otherwise specified. Further, when "movement speed of the nozzle 61" is mentioned, it means a relative speed of the nozzle 61 with respect to the table 210.

Figure 2:
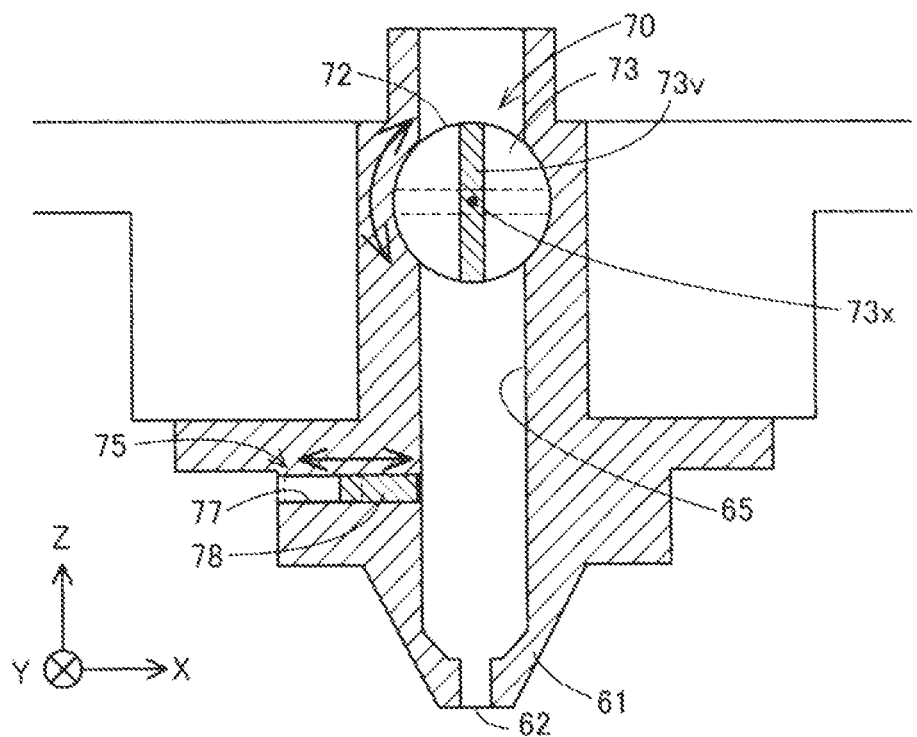
FIG. 2 is a view schematically showing a configuration of a discharge control mechanism and a suction portion.

FIG. 2 is a view schematically showing a configuration of the discharge control mechanism 70 and the suction portion 75. In the present embodiment, the discharge control mechanism 70 includes a butterfly valve 72 which changes an opening degree of the flow path 65 by rotation thereof in the flow path 65. The butterfly valve 72 includes a drive shaft 73 which is a shaft-like member extending in one direction, and a valve portion 73v which rotates with the rotation of the drive shaft 73. The drive shaft 73 is attached at the flow path 65 so as to cross a flow direction of the shaping material. In the present embodiment, the drive shaft 73 is disposed parallel to the Y direction so as to cross the flow path 65 perpendicularly. The drive shaft 73 is rotatable about a central axis 73x thereof.

The valve portion 73v is a plate-like portion which rotates in the flow path 65. In the first embodiment, the valve portion 73v is formed by processing a portion of the drive shaft 73 disposed in the flow path 65 into a plate shape. The shape when the valve portion 73v is viewed in a direction perpendicular to a plate surface thereof substantially matches an opening shape of the flow path 65 at a portion in which the valve portion 73v is disposed.

A state in which a plate surface of the valve portion 73v follows along the flow direction of the shaping material in the flow path 65, as shown by a solid line in FIG. 2, is the state in which the flow path 65 is open. In the state, inflow of the shaping material is allowed from the butterfly valve 72 to the nozzle 61 side. As illustrated by a broken line in FIG. 2, a state in which the plate surface of the valve portion 73v is perpendicular to the flow direction of the shaping material in the flow path 65 is the state in which the flow path 65 is closed. In the state, the inflow of the shaping material from the butterfly valve 72 to the nozzle 61 side is blocked, and the discharge of shaping material from the discharge port 62 of the nozzle 61 is stopped. The control portion 101 can adjust a flow rate of shaping material flowing from the plasticizing portion 30 to the nozzle 61, that is, the flow rate of the shaping material discharged from the nozzle 61, by controlling a rotation angle of the butterfly valve 72.

A first drive portion 74 shown in FIG. 1 is constituted with, for example, a stepping motor. The first drive portion 74 controls the discharge amount of the shaping material from the nozzle 61 by rotating the drive shaft 73 and adjusting a rotation angle of the valve portion 73v under the control of the control portion 101. In the present embodiment, the control portion 101 controls the discharge control mechanism 70 so that when the movement speed of the nozzle 61 is a first speed, the discharge amount of the shaping material is set to a first discharge amount, and when the movement speed of the nozzle 61 is a second speed which is slower than the first speed, the discharge amount of the shaping material is set to a second discharge amount which is smaller than the first discharge amount. Further, in the present embodiment, the control portion 101 controls the discharge control mechanism 70 according to the movement speed of the nozzle 61 to control the discharge amount so that the discharge amount of the shaping material per unit volume in the three-dimensional shaping object is constant before and after the movement speed of the nozzle 61 changes.

The suction portion 75 is connected to the flow path 65 between the discharge control mechanism 70 and the discharge port 62. The suction portion 75 sucks and temporarily stores the shaping material in the flow path 65. In the present embodiment, the suction portion 75 is constituted with a plunger including a sub flow path 77 connected to the flow path 65 and a valve body 78 moving in the sub flow path 77. The suction portion 75 generates a negative pressure by moving the valve body 78 in the sub flow path 77 and sucks the shaping material. The sub flow path 77 extends linearly toward a side direction of the flow path 65. The valve body 78 is constituted with a rod-like member extending along the sub flow path 77, and is disposed to be reciprocally movable in the sub flow path 77.

A second drive portion 76 driving the suction portion 75 illustrated in FIG. 1 changes a position of the valve body 78 in the sub flow path 77 under the control of the control portion 101. The second drive portion 76 is constituted with, for example, a stepping motor, and a rack-and-pinion mechanism or a ball screw mechanism which converts a rotational force of the stepping motor into translational motion of the valve body 78.

In the present embodiment, as described above, the suction portion 75 is connected between the discharge control mechanism 70 and the discharge port 62. That is, a distance from the suction portion 75 to the nozzle 61 is shorter than a distance from the discharge control mechanism 70 to the nozzle 61. Therefore, in the present embodiment, responsiveness of the suction portion 75 regarding discharge or stop of the shaping material is superior to responsiveness of the discharge control mechanism 70.

When the shaping material is discharged from the nozzle 61, as shown in FIG. 2, the second drive portion 76 positions the valve body 78 at a position in which an end thereof faces the flow path 65 and the inflow of the shaping material to the sub flow path 77 is blocked. When the discharge of the shaping material from the nozzle 61 is stopped, the second drive portion 76 moves the valve body 78 away from the flow path 65 to a position illustrated by a broken line in FIG. 2. As a result, a volume of a space communicating with the flow path 65 in the sub flow path 77 is increased, the shaping material is drawn from the flow path 65 to the sub flow path 77, and the shaping material discharged from the nozzle 61 is trimmed.

In the present embodiment, for example, when controlling the discharge control mechanism 70 to stop the discharge of the shaping material from the nozzle 61, the control portion 101 causes the suction portion 75 to perform suction of the shaping material. Further, in the present embodiment, for example, when starting or resuming the discharge of the shaping material from the nozzle 61, the control portion 101 starts the movement of the nozzle 61 after transmitting part of the shaping material reserved in the suction portion 75 from the suction portion 75 to the flow path 65, and controls the discharge control mechanism to start supplying the shaping material from the plasticizing portion 30 to the nozzle 61 and to send the remaining shaping material reserved in the suction portion 75 from the suction portion 75 to the flow path 65. Control contents of the control portion 101 will be described in detail later.

Figure 3:
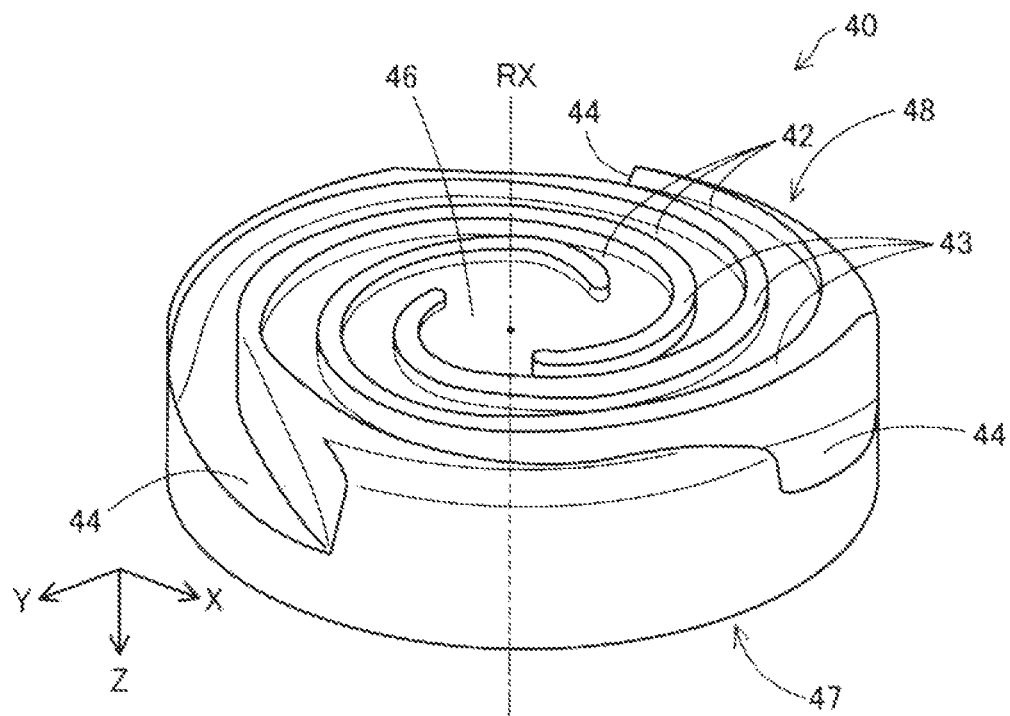
FIG. 3 is a schematic perspective view showing a configuration on a lower surface side of a flat screw.

FIG. 3 is a schematic perspective view showing a configuration of the lower surface 48 side of the flat screw 40. In FIG. 3, a position of the central axis RX of the flat screw 40 is illustrated by an alternate long and short dash line. As described with reference to FIG. 1, a groove portion 42 is provided on the lower surface 48 of the flat screw 40 facing the screw facing portion 50. Hereinafter, the lower surface 48 is also referred to as the "grooved surface 48".

The center portion 46 of the grooved surface 48 of the flat screw 40 is constituted with a recess portion to which one end of the groove portion 42 is connected. The center portion 46 faces the communication hole 56 of the screw facing portion 50 as shown in FIG. 1. In the first embodiment, the center portion 46 intersects with the central axis RX.

The groove portion 42 of the flat screw 40 constitutes a so-called scroll groove. The groove portion 42 extends in a spiral shape so as to draw an arc from the center portion 46 to an outer circumference of the flat screw 40. The groove portion 42 may be configured to extend helically. The grooved surface 48 is provided with a projection strip portion 43 which constitutes a side wall portion of the groove portion 42 and extends along each groove portion 42.

The groove portion 42 is continuous to a material inlet 44 formed on a side of the flat screw 40. The material inlet 44 is a part which receives the material MR supplied via the communication passage 22 of the material supply portion 20.

An example of a flat screw 40 having the three groove portions 42 and the three projection strip portions 43 is shown in FIG. 3. The number of the groove portions 42 and the projection strip portions 43 provided in the flat screw 40 is not limited to three. Only the one groove portion 42 may be provided in the flat screw 40, or a plurality of the groove portions 42 such as two or more may be provided. Further, an arbitrary number of the projection strip portions 43 may be provided in accordance with the number of the groove portions 42.

An example of the flat screw 40 in which the material inlet 44 is formed at three places is shown in FIG. 3. The number of the material inlets 44 provided in the flat screw 40 is not limited to three. In the flat screw 40, the material inlet 44 may be provided at only one place, or may be provided at a plurality of places such as two or more places.

Figure 4:
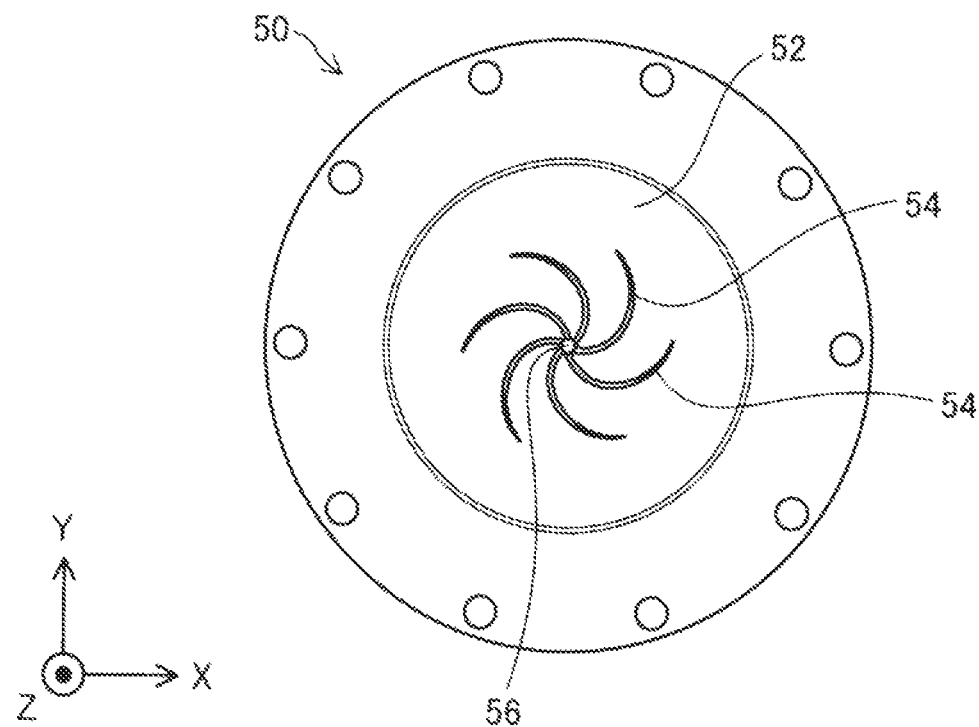
FIG. 4 is a schematic plan view showing an upper surface side of a screw facing portion.

FIG. 4 is a schematic plan view showing the upper surface 52 side of the screw facing portion 50. The upper surface 52 of the screw facing portion 50 faces the grooved surface 48 of the flat screw 40 as described above. Hereinafter, the upper surface 52 is also referred to as the "screw facing surface 52". At a center of the screw facing surface 52, the communication hole 56 described above for supplying the shaping material to the nozzle 61 is formed.

In the screw facing surface 52, a plurality of guide grooves 54 which are connected to the communication hole 56 and spirally extending from the communication hole 56 toward an outer circumference of the screw facing surface 52, are formed. The plurality of guide grooves 54 have a function of guiding the shaping material flowing into the center portion 46 of the flat screw 40 to the communication hole 56. As described with reference to FIG. 1, the screw facing portion 50 has the heater 58 embedded therein. Melting of the material MR in the plasticizing portion 30 is realized by heating by the heater 58 and the rotation of the flat screw 40.

Please refer to FIG. 1 and FIG. 2. As the flat screw 40 rotates, the material MR supplied from the material inlet 44 is guided to the groove portion 42 and moved toward the center portion 46 while being heated in the groove portion 42. The material MR melts and becomes more fluid as the material MR approaches the center portion 46, and is converted into the shaping material. The shaping material collected in the center portion 46 flows out from the communication hole 56 by an internal pressure generated in the center portion 46, is guided by the flow path 65 of the nozzle 61, and is discharged from the discharge port 62.

Figure 5:
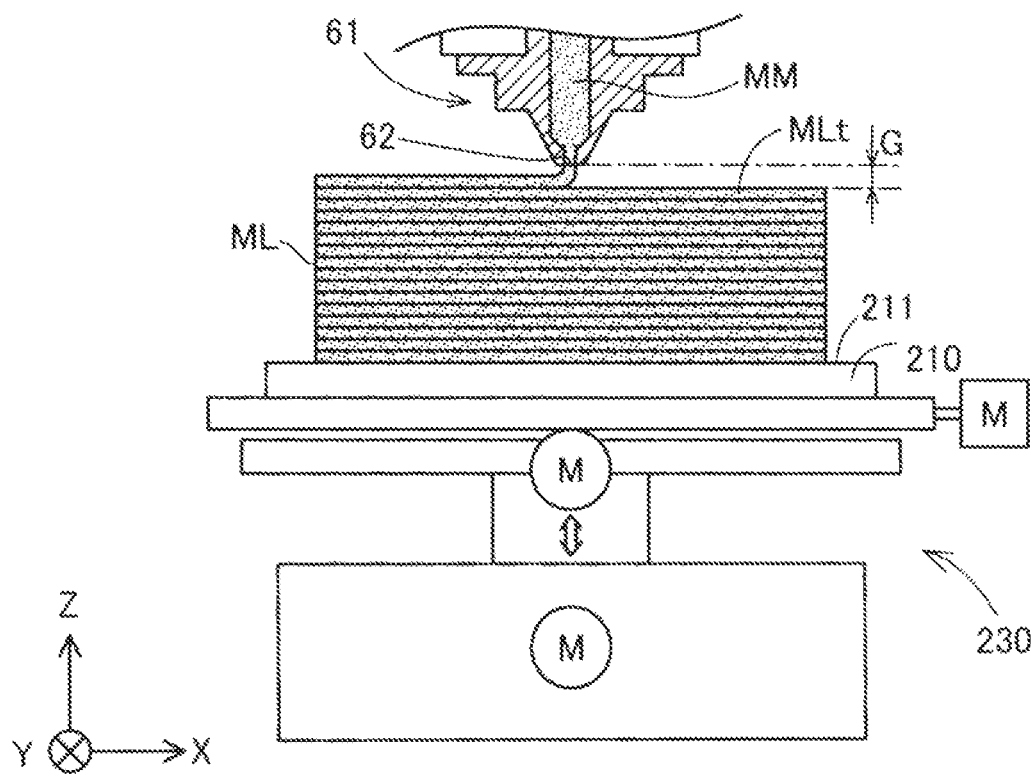
FIG. 5 is a view schematically showing an aspect of how a three-dimensional shaping object is shaped.

FIG. 5 is a view schematically showing how the three-dimensional shaping object is shaped by the three-dimensional shaping apparatus 100. In the three-dimensional shaping apparatus 100, as described above, the shaping material MM is generated in the plasticizing portion 30. Then, while the nozzle 61 is moved in a direction along the upper surface 211 of the table 210 by the movement mechanism 230, a shaping material MM is discharged from the nozzle 61 toward the upper surface 211 of the table 210.

Here, a layer formed of the shaping material MM discharged by the shaping processing when the nozzle 61 is at a same height position with respect to the upper surface 211 of the table 210 is referred to as a "shaping layer ML". The control portion 101 shapes the three-dimensional shaping object by moving the position of the nozzle 61 in the Z direction and further stacking the shaping material MM by the next shaping processing on the shaping layer ML formed by the previous shaping processing. That is, the three-dimensional shaping apparatus 100 manufactures the three-dimensional shaping object by stacking the shaping layer ML in multiple layers.

When the shaping layer ML is formed, it is desirable that a following gap G is maintained between the discharge port 62 at the tip of the nozzle 61 and a planned portion MLt on which the shaping material MM discharged from nozzle 61 is to be stacked, at a vicinity of a position immediately below the nozzle 61. When the shaping material MM is discharged on the shaping layer ML, the planned portion MLt, on which the shaping material MM is to be discharged, is an upper surface of the shaping layer ML located below the nozzle 61.

It is preferable that a size of the gap G is equal to or greater than a hole diameter Dn at the discharge port 62 of the nozzle 61, and more preferably equal to or greater than 1.1 times the hole diameter Dn. In this way, the shaping material MM discharged from the discharge port 62 of the nozzle 61 is stacked in a free state in which the shaping material MM is not pressed against the planned portion MLt. As a result, a cross-sectional shape of the shaping material MM discharged from the nozzle 61 can be suppressed from being broken, and surface roughness of the three-dimensional shaping object can be reduced. Further, in a configuration in which a heater is provided around the nozzle 61, overheating of the shaping material MM by the heater can be prevented by forming the gap G, and discoloration and deterioration by the overheating of the shaping material MM after stacking can be suppressed. On the other hand, it is preferable that the size of the gap G is 1.5 times or less than the hole diameter Dn, and particularly preferable that the size is 1.3 times or less. As a result, positional deviation of the discharge position of the shaping material MM with respect to the planned portion MLt and a decrease in adhesion between the shaping layers ML are suppressed.

Figure 6:
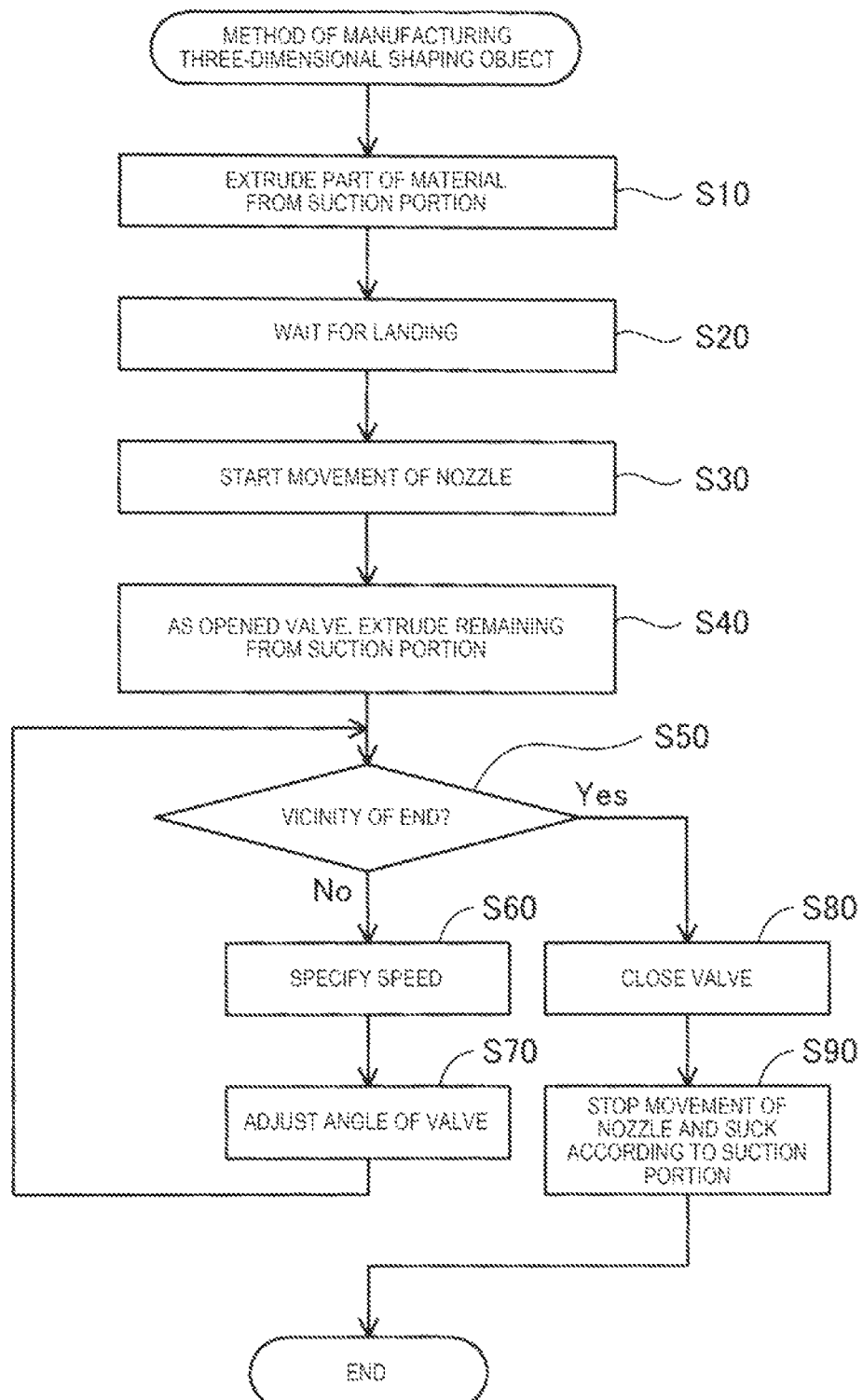
FIG. 6 is a flowchart showing a method of manufacturing the three-dimensional shaping object.
Figure 7:
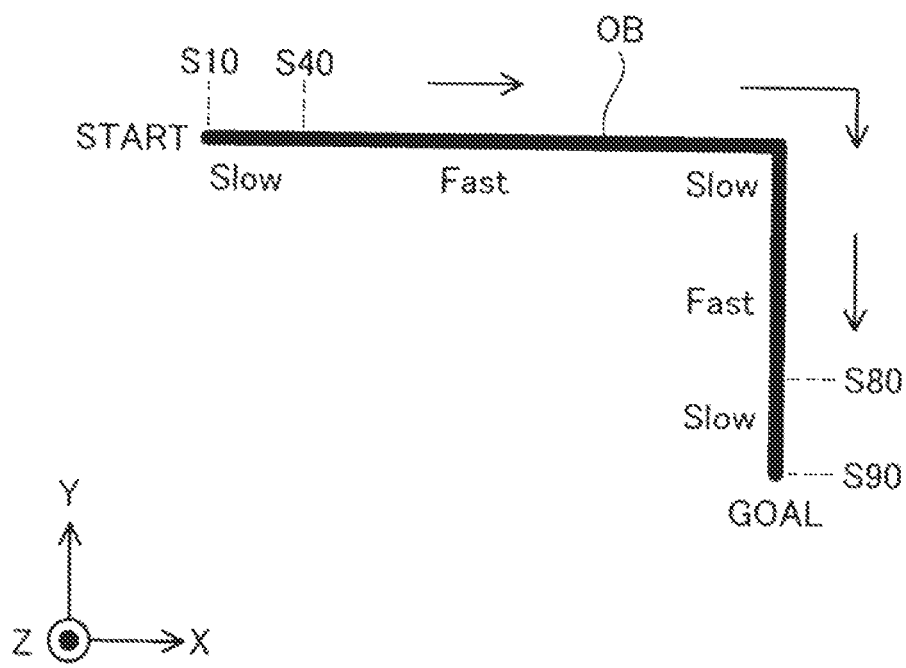
FIG. 7 is a view schematically showing a part of the three-dimensional shaping object represented by shaping data.
Figure 8:
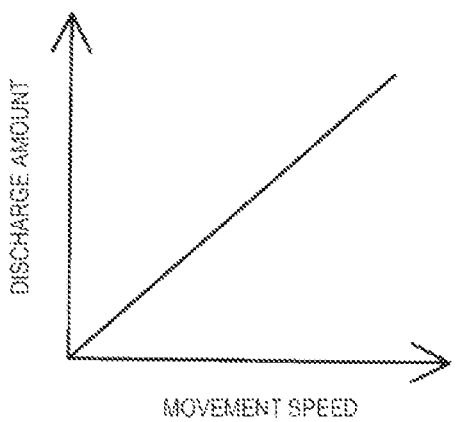
FIG. 8 is a view showing a relationship between a movement speed of a nozzle and a discharge amount of a shaping material.

FIG. 6 is a flowchart showing a method of manufacturing the three-dimensional shaping object. FIG. 7 is a view schematically showing a part of a three-dimensional shaping object OB. FIG. 8 is a diagram showing a relationship between the movement speed of the nozzle 61 and the discharge amount of the shaping material.

A method of manufacturing shown in FIG. 6 is realized by executing a shaping program read into the main storage apparatus by the control portion 101 of the three-dimensional shaping apparatus 100. The flowchart shown in FIG. 6 is a flowchart corresponding to a process from the start of the discharge of the shaping material from the nozzle 61 to the stop of the discharge, and in practice, the entirety of the three-dimensional shaping object is shaped by repeatedly performing the flowchart shown in FIG. 6. When the method of manufacturing is started, it is assumed that the butterfly valve 72 of the discharge control mechanism 70 is in a closed state in advance and the shaping material is sucked and reserved in the suction portion 75 from the flow path 65. Such a state can be generated by setting the discharge control mechanism 70 to a closed state while the nozzle 61 is moved to a predetermined place to discard the shaping material in the flow path 65, and discharging and tailing the shaping material in the flow path 65 by the suction portion 75. Further, even when a series of processing described below is completed, the above state is obtained.

When starting or resuming the discharge of the shaping material, the control portion 101 first controls the suction portion 75 in a step S10 to extrude a part of the shaping material reserved in the suction portion 75 and discharge the shaping material from the nozzle 61, and waits for a predetermined period of time in a step S20. In FIG. 7, extrusion of the shaping material is performed at a position indicated as "START". A waiting period in the step S20 is a period required for the shaping material extruded from the suction portion 75 to land on the table 210 or the shaping-completed shaping layer ML, and is a predetermined period. The table 210 and the shaping-completed shaping layer are hereinafter referred to as the "table 210 or the like". The amount of the shaping material extruded from the suction portion 75 in the step S10 is, for example, 50% by mass of the shaping material reserved in the suction portion 75. The amount is predetermined according to thickness of the shaping material when the shaping material is stacked on the table 210 or the like and the gap G described above. The thickness of the discharged shaping material is also referred to as a "line width". The control portion 101 can adjust the amount of extrusion of the material by controlling the second drive portion 76 to control the amount of movement of the valve body 78.

After the waiting in the step S20 is completed, in a step S30, the control portion 101 starts the movement of the nozzle 61 in accordance with shaping data. The shaping data includes, for example, information indicating movement path of the nozzle 61 and the movement speed of the nozzle 61. Simultaneously with the start of the movement of the nozzle 61 or immediately after the start of the movement of the nozzle 61, the control portion 101 controls the discharge control mechanism 70 to increase the opening degree of the flow path 65 in a step S40, thereby starting the supply of the shaping material from the plasticizing portion 30 to the nozzle 61 and extruding the remaining shaping material reserved in the suction portion 75 from the suction portion 75 to send the shaping material to the flow path 65. As a result, the discharge amount of the shaping material from the nozzle 61 increases more than the discharge amount in the step S10. In the present embodiment, a first timing to start supplying the shaping material from the plasticizing portion 30 to the nozzle 61 and a second timing to extrude the shaping material from the suction portion 75 are simultaneous. However, these timings may be shifted. That is, the first timing may be earlier than the second timing, or the first timing may be later than the second timing. Immediately after the movement of the nozzle 61 is started in the step S30, the movement speed of the nozzle 61 is a relatively slow speed, and after the step S40, the movement speed of the nozzle 61 is a relatively high speed in a linear part of the three-dimensional shaping object OB. The movement speed of the nozzle 61 is slow at a corner of the three-dimensional shaping object OB.

In the step S40, the control portion 101 controls the discharge amount of the shaping material by adjusting the rotation angle of the butterfly valve 72 according to the movement speed of the nozzle 61. In the present embodiment, as shown in FIG. 8, the control portion 101 controls the rotation angle of the butterfly valve 72 so that the discharge amount of the shaping material from the nozzle 61 increases as the movement speed of the nozzle 61 increases. Therefore, if the discharge amount at different movement speeds is compared, when the movement speed of the nozzle 61 is the first speed, the discharge amount of the shaping material is set to the first discharge amount, and when the movement speed of the nozzle 61 is the second speed which is slower than the first speed, the discharge amount of the shaping material is set to the second discharge amount which is smaller than the first discharge amount. In the present embodiment, when the "discharge amount of the shaping material" is simply mentioned, the term refers to the flow rate of the shaping material discharged from the nozzle 61 and to the amount of shaping material discharged from the nozzle 61 per unit time. The movement speed of the nozzle 61 can be specified by acquiring a value specified by the shaping data from the shaping data. In another embodiment, the movement mechanism 230 may be provided with a rotary encoder, a speed sensor, or an acceleration sensor to measure the movement speed of the nozzle 61.

In a step S50, the control portion 101 determines whether or not a current position of the nozzle 61 is at a vicinity of an end of the movement path of the nozzle 61 represented by the shaping data. The "vicinity of the end of the movement path" will be described later. When it is determined that the position of the nozzle 61 is not at the vicinity of the end of the movement path of the nozzle 61, the control portion 101 specifies the movement speed of the nozzle 61 in a step S60, and according to the specified movement speed, adjusts the rotation angle of the butterfly valve 72 to control the discharge amount of the shaping material in a step S70.

In the steps S40 and S70, the control portion 101 controls the discharge amount so that the discharge amount of the shaping material per unit volume in the three-dimensional shaping object is constant before and after the movement speed of the nozzle 61 changes. That is, in the present embodiment, for example, in FIG. 8, the control portion 101 controls the discharge control mechanism 70 to control the discharge amount so that a line width of the shaping material discharged to the table 210 or the like does not change at fixed distances in the part indicated as "Slow" and the part indicated as "Fast" which have different movement speeds of the nozzle 61. "The discharge amount of the shaping material per unit volume in the three-dimensional shaping object is constant" means that the amount of the shaping material discharged per same volume of the three-dimensional shaping object is the same. The discharge amount of the shaping material per unit volume in the three-dimensional shaping object may not be completely constant before and after the movement speed of the nozzle 61 changes, for example, in the range of ±10%, or preferably, in the range of ±5%.

When it is determined that the position of the nozzle 61 is at the vicinity of the end of the movement path of the nozzle 61 in the step S50, the control portion 101 controls the discharge control mechanism 70 in a step S80 to close the butterfly valve 72 and stop the discharge of the shaping material. Then, after the butterfly valve 72 is closed, in a step S90, the control portion 101 stops the movement of the nozzle 61 and controls the suction portion 75 to suck the shaping material in the flow path 65 into the suction portion 75. The "vicinity of the end of the movement path" is a position which is traced back from the end of the movement path up to a predetermined distance along the path. The distance to be traced back is determined such that the amount of the shaping material discharged from the nozzle 61 from a time at which the butterfly valve 72 is closed in the step S80 until the shaping material is sucked by the suction portion 75 in the step S90 is determined by experiment or calculation in advance and the shaping in the distance is possible by the amount.

The control portion 101 manufactures the entire three-dimensional shaping object by performing the method of manufacturing the three-dimensional shaping object described above for all the movement paths recorded in the shaping data.

In the three-dimensional shaping apparatus 100 of the present embodiment described above, the discharge control mechanism 70 is controlled according to the movement speed of the nozzle 61 so that when the movement speed of the nozzle 61 is the first speed, the discharge amount of the shaping material is set to the first discharge amount, and when the movement speed of the nozzle 61 is the second speed which is slower than the first speed, the discharge amount of the shaping material is set to the second discharge amount which is smaller than the first discharge amount. Therefore, it is possible to suppress a change in the line width of the shaping material stacked on the table 210 or the like in a part in which the movement speed of the nozzle 61 changes, such as an end or a corner of the three-dimensional shaping object. Therefore, the shaping precision of the three-dimensional shaping object can be improved.

Further, in the present embodiment, the discharge amount is controlled so that the discharge amount of the shaping material per unit volume in the three-dimensional shaping object is constant before and after the movement speed of the nozzle 61 changes. Therefore, the shaping precision of the three-dimensional shaping object can be further improved.

Further, in the present embodiment, the butterfly valve 72 is controlled to control the discharge amount of the shaping material. Therefore, the discharge amount of the shaping material can be adjusted by a simple configuration.

Further, in the present embodiment, when the discharge of the shaping material is stopped, the shaping material is sucked by the suction portion 75, so that it is possible to suppress the trailing of the shaping material from the nozzle 61.

Further, in the present embodiment, when the discharge of the shaping material from the nozzle 61 is started or resumed, the movement of the nozzle 61 is started after the suction portion 75 sends the part of the shaping material reserved in the suction portion 75 to the flow path 65 and the part of the shaping material is discharged from the nozzle 61, and the discharge control mechanism 70 is controlled to start supplying the shaping material from the plasticizing portion 30 to the nozzle 61 and the remaining shaping material reserved in the suction portion 75 is sent from the suction portion 75 to the flow path 65. Therefore, it is possible to discharge the shaping material using the highly responsive suction portion 75 so as to compensate for the responsiveness of the discharge control mechanism 70. Therefore, the shaping speed of the three-dimensional shaping object can be improved.

Further, in the present embodiment, when it is determined that the position of the nozzle 61 is at the vicinity of the end of the path for discharging the shaping material, it is determined that the discharge of the shaping material from the nozzle 61 is stopped. Therefore, even in the present embodiment in which the responsiveness of the discharge control mechanism 70 is low, it is possible to stop the discharge of the shaping material with good timing. Therefore, the shaping precision of the three-dimensional shaping object can be improved.

Further, in the present embodiment, since the flat screw 40 is adopted in the plasticizing portion 30, it is possible to miniaturize the three-dimensional shaping apparatus 100.

Here, the material of the three-dimensional shaping object used in the three-dimensional shaping apparatus 100 described above will be described. In the three-dimensional shaping apparatus 100, the three-dimensional shaping object can be shaped, for example, with various materials such as a material having thermoplasticity, a metal material, and a ceramic material as a main material. Here, the "main material" means a main material which forms a shape of the three-dimensional shaping object, and means a material which accounts for a content of 50% by weight or more in the three-dimensional shaping object. The shaping material described above includes one in which the main material is melted alone, and one in which a part of the components contained together with the main material is melted and made into a paste shape.

When a material having thermoplasticity is used as the main material, the shaping material is generated in the plasticizing portion 30 by the material being plasticized. A "plasticization" means that heat is applied to the material having thermoplasticity to melt the material.

As the material having thermoplasticity, for example, the following thermoplastic resin material can be used.

Examples of Thermoplastic Resin Materials

General purpose engineering plastics such as polypropylene resin (PP), polyethylene resin (PE), polyacetal resin (POM), polyvinyl chloride resin (PVC), polyamide resin (PA), acrylonitrile butadiene styrene resin (ABS), polylactic acid resin (PLA), polyphenylene sulfide resin (PPS), polyetheretherketone (PEEK), polycarbonate (PC), modified polyphenylene ether, polybutylene terephthalate, and polyethylene terephthalate, or engineering plastics such as polysulfone, polyether sulfone, polyphenylene sulfide, polyarylate, polyimide, polyamide imide, polyether imide, and polyether ether ketone In the material having thermoplasticity, additives such as a wax, a flame retardant, an antioxidant, and a heat stabilizer may be mixed with a pigment, a metal, a ceramic, or the like. The thermoplastic material is plasticized and converted to a melted state in the plasticizing portion 30 by the rotation of the flat screw 40 and the heating of the heater 58. The shaping material generated by the melting of the thermoplastic material is discharged from the nozzle 61 and then cured by a decrease in temperature.

It is desirable that the material having thermoplasticity is ejected from the nozzle 61 in a completely melted state by being heated to a temperature higher than or equal to a glass transition point thereof. For example, it is desirable that the ABS resin which has a glass transition point of about 120° C. is at about 200° C. when discharged from the nozzle 61. A heater may be provided around the nozzle 61 in order to discharge the shaping material in such a high temperature state.

In the three-dimensional shaping apparatus 100, for example, the following metal material may be used as the main material instead of the material having thermoplasticity described above. In this case, it is desirable that components to be melted during the generation of the shaping material is mixed with the powder material made of the following metal material and the mixture as the material MR is introduced into the plasticizing portion 30.

Examples of Metal Materials

A single metal of magnesium (Mg), iron (Fe), cobalt (Co), chromium (Cr), aluminum (Al), titanium (Ti), copper (Cu), and nickel (Ni), or an alloy containing one or more of these metals Examples of the Alloys Described Above Maraging steel, stainless steel, cobalt chromium molybdenum, titanium alloy, nickel alloy, aluminum alloy, cobalt alloy, and cobalt chromium alloy In the three-dimensional shaping apparatus 100, it is possible to use a ceramic material as the main material instead of the metal material described above. As the ceramic material, for example, oxide ceramics such as silicon dioxide, titanium dioxide, aluminum oxide and zirconium oxide, and non-oxide ceramics such as aluminum nitride can be used. When the metal material or the ceramic material as described above is used as the main material, the shaping material disposed in the table 210 may be cured by sintering.

The powder material of the metal material or the ceramic material introduced to the material supply portion 20 as the material MR may be a single metal powder and an alloy powder, or a mixed material produced by mixing a plurality of types of ceramic material powders. Further, the powder material of the metal material or the ceramic material may be coated with, for example, a thermoplastic resin as exemplified above, or other thermoplastic resins. In this case, the thermoplastic resin may be melted to develop fluidity in the plasticizing portion 30.

For example, the following solvent may be added to the powder material of the metal material or the ceramic material which are introduced to the material supply portion 20 as the material MR. The solvent can be used by combining 1 type, or 2 or more types selected from the following.

Examples of Solvent

Water, (poly) alkylene glycol monoalkyl ethers such as ethylene glycol monomethyl ether, ethylene glycol monoethyl ether, propylene glycol monomethyl ether, and propylene glycol monoethyl ether, acetate esters such as ethyl acetate, n-propyl acetate, iso-propyl acetate, n-butyl acetate, and iso-butyl acetate, aromatic hydrocarbons such as benzene, toluene and xylene, ketones such as methyl ethyl ketone, acetone, methyl isobutyl ketone, ethyl n-butyl ketone, diisopropyl ketone and acetylacetone, alcohols such as ethanol, propanol and butanol, tetraalkyl ammonium acetates, sulfoxide solvents such as dimethyl sulfoxide and diethyl sulfoxide, pyridine solvents such as pyridine, γ-picoline and 2,6-lutidine, and ionic liquids such as tetraalkyl ammonium acetate (for example, tetrabutyl ammonium acetate or the like) and butyl carbitol acetate In addition, for example, the following binder may be added to the powder material of the metal material or the ceramic material introduced as the material MR into the material supply portion 20.

Examples of Binders

Acrylic resin, epoxy resin, silicone resin, cellulose resin or other synthetic resin, or PLA (polylactic acid), PA (polyamide), PPS (polyphenylene sulfide), PEEK (polyether ether ketone) or other thermoplastic resin B. Other Embodiments (B-1) The three-dimensional shaping apparatus 100 is not limited to one which plasticizes the material by the flat screw 40. For example, the three-dimensional shaping apparatus 100 may be one which plasticizes the material by rotating an in-line screw instead of the flat screw 40.

(B-2) The discharge control mechanism 70 of the embodiment described above may be constituted with a valve other than the butterfly valve 72. For example, instead of the butterfly valve 72, a valve such as a ball valve or a diaphragm valve may be adopted.

(B-3) The three-dimensional shaping apparatus 100 of the embodiment described above may not include the suction portion 75. Even with the configuration, by using the discharge control mechanism 70, it is possible to control the discharge amount so that the discharge amount of the shaping material is constant before and after the movement speed of the nozzle 61 changes.

(B-4) In the embodiment described above, when the control portion 101 controls the discharge control mechanism 70 to stop the discharge of the shaping material from the nozzle 61, the shaping material is sucked by the suction portion 75 after the butterfly valve 72 is closed. On the other hand, the control portion 101 may perform the suction of the shaping material by the suction portion 75 at a time when the butterfly valve 72 changes from the open state to the closed state or at the same time when the butterfly valve 72 closes. That is, the control portion 101 may suck the shaping material by the suction portion 75 when the discharge amount of the shaping material from the nozzle 61 decreases or when the discharge of the shaping material from the nozzle 61 is stopped.

(B-5) In the embodiment described above, the gap G between the tip of the nozzle 61 and the planned portion MLt in which the shaping material MM is stacked may be less than the hole diameter Dn at the discharge port 62 of the nozzle 61. In this case, the shaping material MM discharged from the discharge port 62 of the nozzle 61 is pressed against the planned portion MLt and can be stacked while following a wall of the shaping material already disposed at an adjacent position or a wall of the shaping material already disposed at a lower layer. As a result, since the shaping material is stacked so as to fill void in the vicinity of the planned portion MLt to be stacked, the three-dimensional shaping object with a low percentage of the void can be obtained and strength of the three-dimensional shaping object can be improved.

C. Other Aspects

The present disclosure is not limited to each of the embodiments described above, and can be realized with various aspects in the range without departing from the gist thereof. For example, the present disclosure can be implemented as the following aspects. The technical features in each of the embodiments described above corresponding to the technical features in each of aspects described below may be replaced or combined as appropriate in order to solve part or all of the problems which the present disclosure includes or to accomplish part of all of the effects which the present disclosure achieves. In addition, unless the technical feature is described as essential in the present disclosure, the technical feature can be deleted as appropriate.

(1) According to a first aspect of the present disclosure, a three-dimensional shaping apparatus is provided that shapes a three-dimensional shaping object. The three-dimensional shaping apparatus includes a plasticizing portion plasticizing a material to generate a shaping material, a nozzle having a discharge port discharging the shaping material toward a table, a movement mechanism changing a relative position between the nozzle and the table, a discharge control mechanism provided in a flow path which connects the plasticizing portion to the nozzle and controlling a discharge amount of the shaping material from the nozzle, and a control portion controlling the plasticizing portion, the movement mechanism, and the discharge control mechanism to shape the three-dimensional shaping object, in which the control portion controls the discharge control mechanism so that when a relative movement speed between the nozzle and the table is a first speed, the discharge amount of the shaping material is set to a first discharge amount, and when the relative movement speed between the nozzle and the table is a second speed which is slower than the first speed, the discharge amount of the shaping material is set to a second discharge amount which is smaller than the first discharge amount.

In such a three-dimensional shaping apparatus of the aspect, when the relative movement speed between the nozzle and the table is high, the discharge amount of the shaping material is large, and when the relative movement speed is slow, the discharge amount of the shaping material is small, so that the shaping precision of the three-dimensional shaping object can be improved.

(2) In the three-dimensional shaping apparatus of the aspect, the control portion may use the discharge control mechanism to control the discharge amount so that the discharge amount of the shaping material per unit volume in the three-dimensional shaping object is constant before and after the relative movement speed between the nozzle and the table changes. In such a three-dimensional shaping apparatus of the aspect, since the discharge amount of the shaping material per unit volume in the three-dimensional shaping object is constant before and after the relative movement speed between the nozzle and the table changes, the shaping precision of the three-dimensional shaping object can be improved.

(3) In the three-dimensional shaping apparatus of the aspect, the discharge control mechanism may include a butterfly valve which changes an opening degree of the flow path by rotation thereof in the flow path, and the control portion controls the discharge amount by adjusting a rotation angle of the butterfly valve according to the relative movement speed between the nozzle and the table. In such a three-dimensional shaping apparatus of the aspect, the discharge amount of the shaping material can be adjusted by a simple configuration.

(4) In the three-dimensional shaping apparatus of the aspect, there may be provided a suction portion connected to the flow path between the discharge control mechanism and the discharge port in the flow path and suctioning and temporarily reserving the shaping material in the flow path, in which the control portion may cause the suction portion to perform suction of the shaping material when discharge of the shaping material from the nozzle is stopped by controlling the discharge control mechanism. In such a three-dimensional shaping apparatus of the aspect, when the discharge of the shaping material from the nozzle is stopped, it is possible to suppress the trailing of the shaping material from the nozzle.

(5) In the three-dimensional shaping apparatus of the aspect, the control portion may start movement of the nozzle after a part of the shaping material reserved in the suction portion is sent from the suction portion to the flow path to be discharged from the nozzle when the discharge of the shaping material from the nozzle is started, control the discharge control mechanism to start supplying the shaping material from the plasticizing portion to the nozzle, and send the remaining shaping material reserved in the suction portion from the suction portion to the flow path. In such a three-dimensional shaping apparatus of the aspect, it is possible to discharge the shaping material using the suction portion so as to compensate for the responsiveness of the discharge control mechanism, so that shaping speed of the three-dimensional shaping object can be improved.

(6) In the three-dimensional shaping apparatus of the aspect, the control portion may determine that the discharge of the shaping material is to be stopped from the nozzle when the position of the nozzle relative to the table is determined to be at a vicinity of a path for discharging the shaping material. In such a three-dimensional shaping apparatus of the aspect, it is possible to stop the discharge of the shaping material with good timing even when responsiveness of the discharge control mechanism is low.

(7) In the three-dimensional shaping apparatus of the aspect, the plasticizing portion may include a flat screw having a grooved surface on which a groove portion is formed and a barrel including a facing surface facing the grooved surface of the flat screw, a communication hole formed on the facing surface, and a heater, and the plasticizing portion may generate the shaping material by melting at least a part of the material by rotation of the flat screw and heating by the heater and cause the shaping material to flow out of the communication hole. In such an aspect, the three-dimensional shaping apparatus can be miniaturized.

(8) According to a second aspect of the present disclosure, a method of manufacturing a three-dimensional shaping object is provided. The method of manufacturing includes generating a shaping material by plasticizing a material by a plasticizing portion and discharging the shaping material from a nozzle towards a table while changing a relative position of the nozzle and the table, in which a discharge control mechanism which is provided in a flow path connecting the plasticizing portion to the nozzle and controls a discharge amount of the shaping material from the nozzle is controlled so that when a relative movement speed between the nozzle and the table is a first speed, the discharge amount of the shaping material is set to a first discharge amount, and when the relative movement speed between the nozzle and the table is a second speed which is slower than the first speed, the discharge amount of the shaping material is set to a second discharge amount which is smaller than the first discharge amount.

In such a method of manufacturing the three-dimensional shaping object of the aspect, when the relative movement speed between the nozzle and the table is high, the discharge amount of the shaping material is large, and when the relative movement speed is slow, the discharge amount of the shaping material is small, so that the shaping precision of the three-dimensional shaping object can be improved.

The present disclosure is not limited to the method of manufacturing the three-dimensional shaping apparatus described above or the three-dimensional shaping object, and can be realized in various forms. For example, it can be realized in the form of a method of controlling the three-dimensional shaping apparatus, a three-dimensional shaping method, a computer program for shaping the three-dimensional shaping object, a non-transitory recording medium which records the computer program, or the like.

What is claimed is:

1. A three-dimensional shaping apparatus shaping a three-dimensional shaping object, comprising:
    a plasticizing member configured to plasticize a material to generate a shaping material;
    a nozzle having a discharge port discharging the shaping material toward a table;
    a movement mechanism changing a relative position between the nozzle and the table;
    a discharge control mechanism that includes a butterfly valve, a drive shaft, and a valve driver, the butterfly valve being a part of the drive shaft, the butterfly valve being provided in a flow path upstream of the discharge port in a shaping material flow direction, the valve driver being configured to rotate the drive shaft, the butterfly valve being configured to control a discharge amount of the shaping material from the discharge port;
    a storage device configured to store a program; and
    a processor configured to execute the program so as to:
    change a relative position of the nozzle and the table at a first speed to discharge the shaping material toward the table;
    set a rotation angle of the butterfly valve to a first degree with respect to the shaping material flow direction to discharge a first discharge amount of the shaping material from the discharge port when the relative position of the nozzle and the table is changed at the first speed;
    change the relative position of the nozzle and the table at a second speed to discharge the shaping material toward the table; and
    set the rotation angle of the butterfly valve to a second degree with respect to the shaping material flow direction to discharge a second discharge amount of the shaping material from the discharge port when the relative position of the nozzle and the table is changed at the second speed,
    wherein the second speed is slower than the first speed, and the second discharge amount is smaller than the first discharge amount.

2. The three-dimensional shaping apparatus according to claim 1,
    wherein the processor is configured to control the discharge control mechanism to adjust a discharge amount of the shaping material per unit volume in the three-dimensional shaping object to be constant during the relative position of the nozzle and the table changes is changed at the first and second speeds.

3. The three-dimensional shaping apparatus according to claim 1, further comprising:
a suction member connected to the flow path between the discharge control mechanism and the discharge port in the flow path, the suction member being configured to suck the shaping material into a branched path from the flow path and reserve the sucked shaping material in the branched path,
wherein the processor is configured to cause the suction member to suck the shaping material when discharge of the shaping material from the discharge port is stopped by controlling the discharge control mechanism.

4. The three-dimensional shaping apparatus according to claim 3,
wherein the processor is configured to control the suction member to eject a part of the reserved shaping material in the suction member to the flow path when the processor causes the nozzle to start discharging the shaping material,
after the suction member ejects the part of the reserved shaping material in the suction member to the flow path, the processor is configured to:
change the relative position of the nozzle and the table;
start supplying the shaping material from the plasticizing member toward the discharge port via the flow path by controlling the discharge control mechanism; and
eject a remaining of the reserved shaping material in the suction member to the flow path.

5. The three-dimensional shaping apparatus according to claim 1,
wherein the plasticizing member includes a flat screw and a barrel,
the flat screw has a grooved surface on which a groove is formed,
the barrel includes a facing surface facing the grooved surface of the flat screw, a communication hole formed on the facing surface, and a heater, and
the plasticizing member is configured to generate the shaping material by melting at least a part of the material by rotation of the flat screw and heating by the heater and cause the shaping material to flow out of the communication hole to the flow path.

6. A method of manufacturing a three-dimensional shaping object, comprising:
plasticizing a material to generate a shaping material;
discharging the shaping material from a discharge port of a nozzle towards a table via a flow path upstream of the discharge port in a shaping material flow direction while changing a relative position of the nozzle and the table to form the three-dimensional shaping object; and
executing a program stored in a memory by a processor so as to:
control a discharge control mechanism to change a discharge amount of the shaping material from the discharge port, the discharge control mechanism including a butterfly valve, a drive shaft, and a valve driver, the butterfly valve being a part of the drive shaft, the butterfly valve being provided in the flow path, the valve driver being configured to rotate the drive shaft, the butterfly valve being configured to control the discharge amount of the shaping material from the discharge port;
change a relative position of the nozzle and the table at a first speed to discharge the shaping material toward the table;
set a rotation angle of the butterfly valve to a first degree with respect to the shaping material flow direction to discharge a first discharge amount of the shaping material from the discharge port when the relative position of the nozzle and the table is changed at the first speed;
change the relative position of the nozzle and the table at a second speed to discharge the shaping material toward the table; and
set the rotation angle of the butterfly valve to a second degree with respect to the shaping material flow direction to discharge a second discharge amount of the shaping material from the discharge port when the relative position of the nozzle and the table is changed at the second speed,
wherein the second speed is slower than the first speed, and the second discharge amount is smaller than the first discharge amount.

* * * * *